United States Patent [19]

Anderson

[11] 4,009,652
[45] Mar. 1, 1977

[54] APPARATUS FOR TRIMMING FAT FROM A BOSTON STYLE BUTT

[76] Inventor: John Anderson, 13030 - 65 St., Edmonton, Alberta, Canada

[22] Filed: July 24, 1975

[21] Appl. No.: 598,887

[52] U.S. Cl. .................................. 99/590; 17/21; 17/1 R
[51] Int. Cl.² ................... A23N 7/00; A47J 17/00; A22B 5/16
[58] Field of Search ............... 17/1 R, 21, 23, 52; 83/1, 4; 99/537, 538, 539, 540, 567, 584, 588, 590, 593

[56] References Cited

UNITED STATES PATENTS

| | | | |
|---|---|---|---|
| 1,759,478 | 5/1930 | Bergstrom | 99/590 X |
| 3,546,737 | 12/1970 | Neebel et al. | 17/1 R |
| 3,685,095 | 8/1972 | Metro | 17/1 R |
| 3,771,196 | 11/1973 | Doerfer et al. | 17/1 R |

Primary Examiner—Harvey C. Hornsby
Assistant Examiner—Robert Pous
Attorney, Agent, or Firm—E. P. Johnson

[57] ABSTRACT

The machine comprises a frame having an arcuate knife pivotally mounted thereon. A saddle element supports a butt to be trimmed so that it is located in the path of the knife. A clamp-down assembly pins the butt to the saddle so that it is fixed. The knife is curved to conform to the curvature of the lean meat-back fat interface of the butt; the saddle surface is curved to conform to the outer surface of the butt fat layer. In operation, the knife is drawn through the fixed butt and severs a layer of fat of uneven thickness, leaving a layer of generally constant thickness adhering to the lean meat. On the return stroke, the knife pushes the unclamped butt and severed fat from the saddle.

4 Claims, 13 Drawing Figures

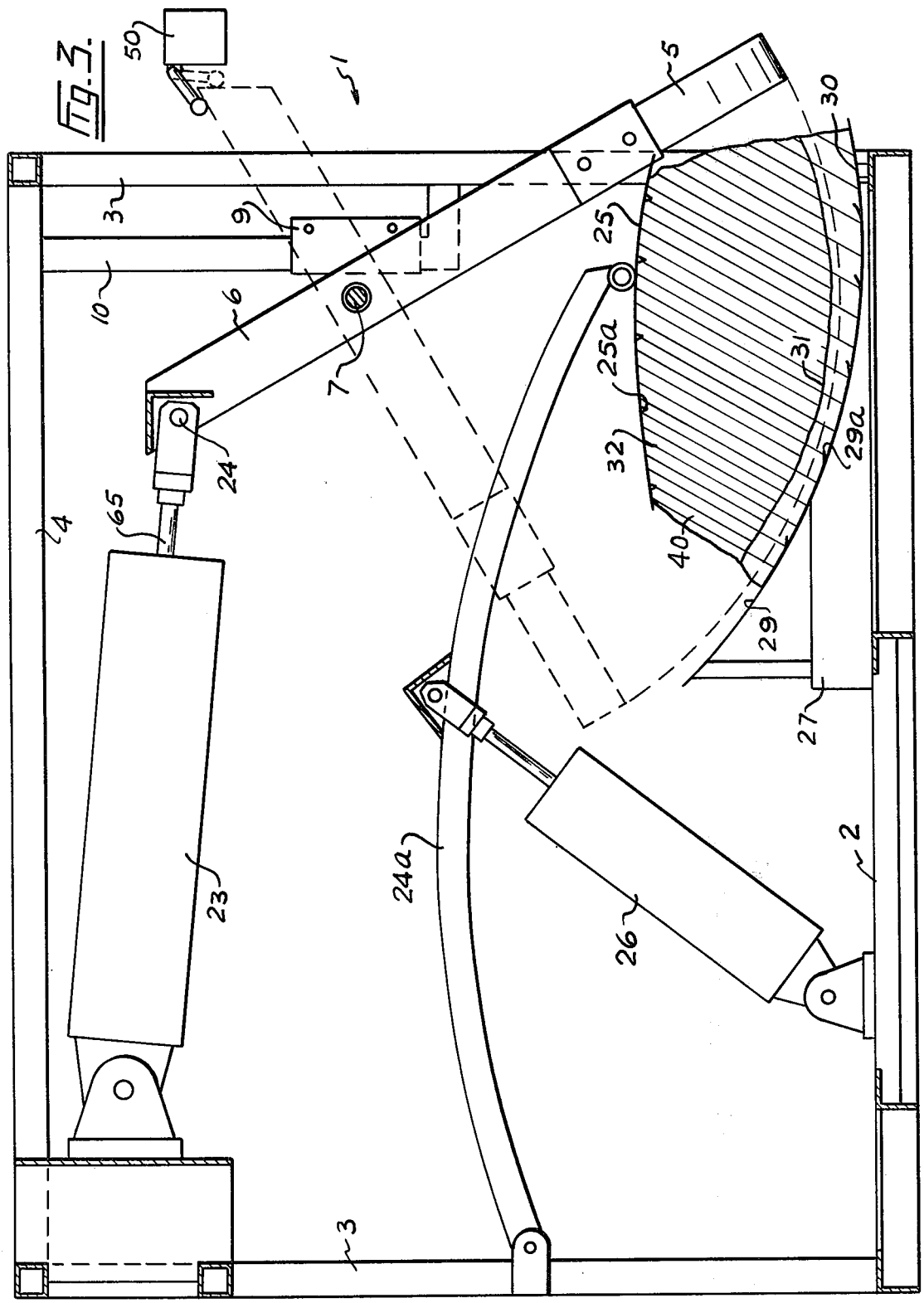

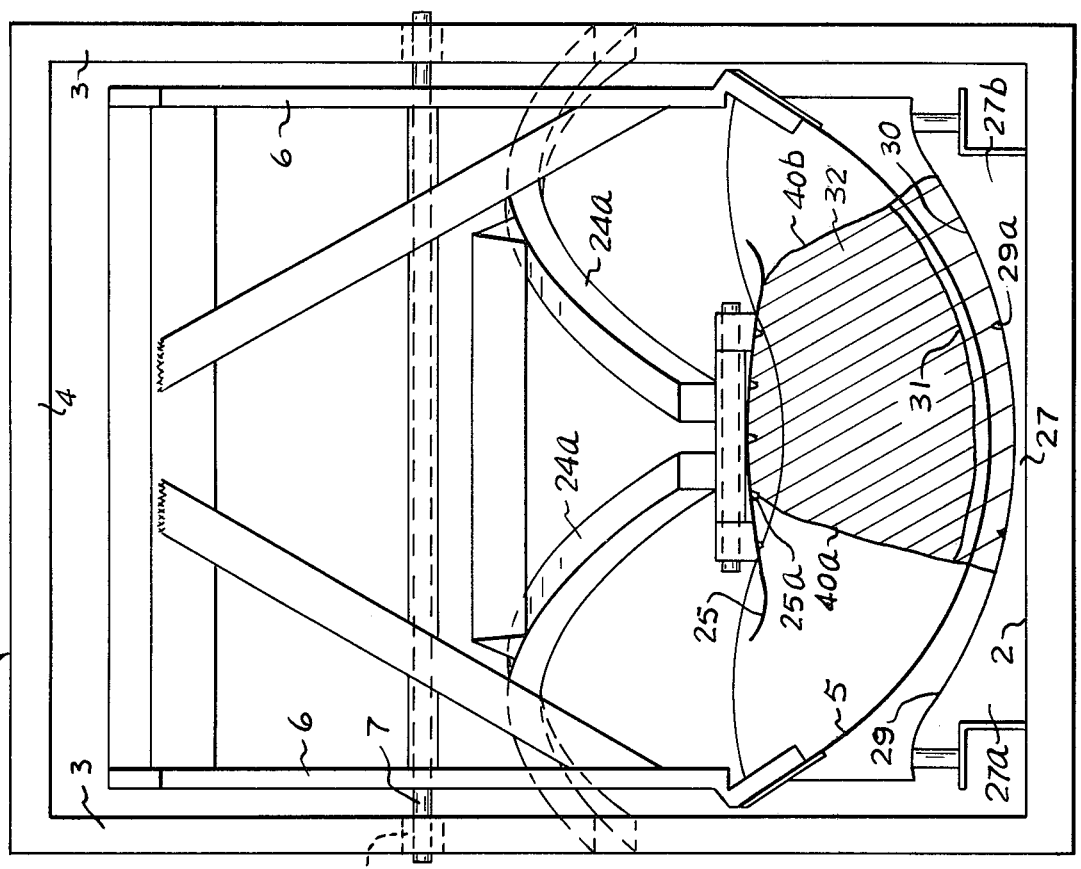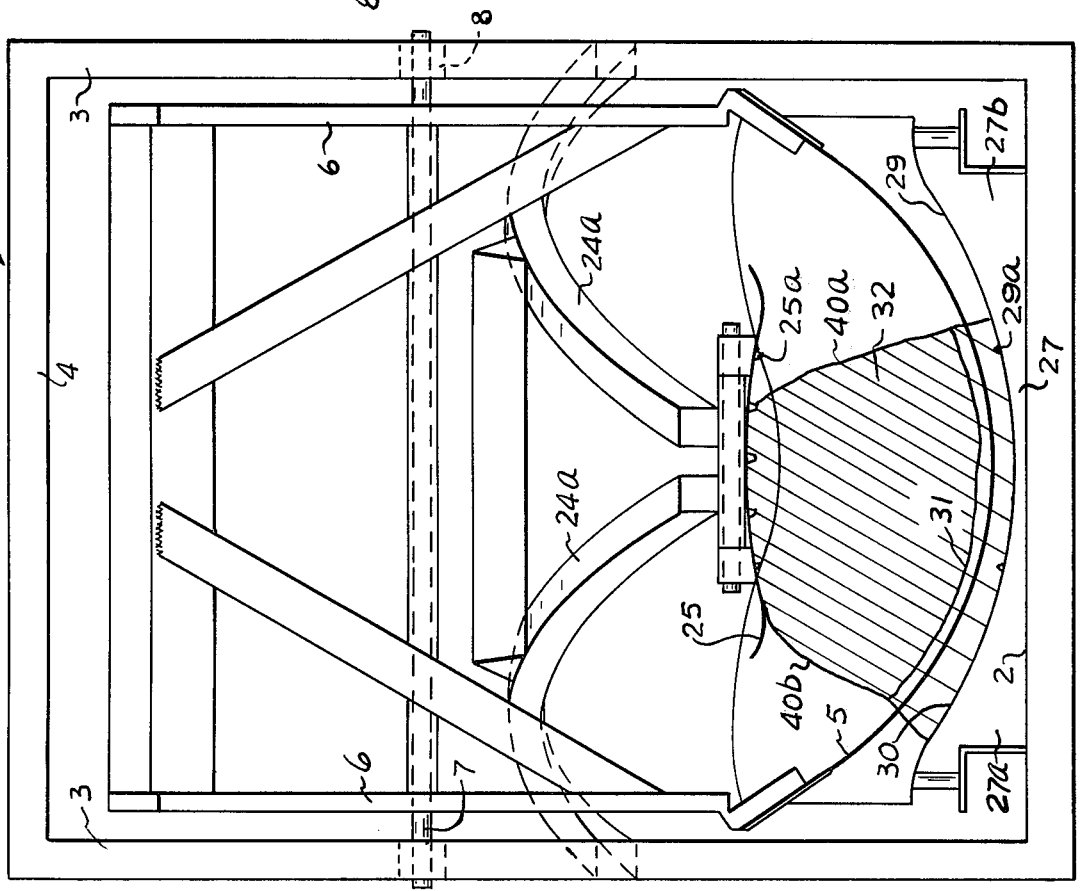

APPARATUS FOR TRIMMING FAT FROM A BOSTON STYLE BUTT

BACKGROUND OF THE INVENTION

This invention relates to apparatus for severing a layer of fat from a Boston style pork shoulder butt.

In the processing of the Boston butt cut, it has heretofore been necessary to manually slice a layer of back fat from the cut to render it marketable. This operation has involved a packing house worker pulling a knife lengthwise along the back of the cut, removing a fat layer of uneven thickness so as to leave about a one-half inch thick layer of fat on the cut. The process is time-consuming and requires the services of a trained person. These workers are difficult to keep on the job, as it soon becomes monotonous to them. Therefore, there has been a long standing need for a machine capable of severing the excess fat in the manner which has previously been carried out manually.

U.S. Pat. No. 3,685,095, issued to Metro, has previously disclosed a machine for trimming fat from a pork loin. This machine involves mounting an arcuate knife on parallel, spaced guide rails. The loin is supported in the path of the knife by a bed. A clamping device fixes the loin firmly against the bed and the knife is then drawn along the guide rails through the cut to trim the excess fat. Once the drawing stroke is complete, the bed, which is hinged along one side, drops away and the cut falls onto a conveyor belt located beneath and is removed. This machine, however, cannot be used with a pork butt, due to the variation in thickness of the butt back fat and to the rounded configuration of the cut.

SUMMARY OF THE INVENTION

In accordance with the present invention, a novel machine is provided having an arcuate knife pivotally mounted on a frame for movement along an arc. The shape of the knife is such that it substantially conforms to the curved interface of the lean meat and the back fat layer. A saddle element, having a specially contoured supporting surface, is operatively associated with the knife. The shape of the supporting surface is such that it substantially conforms with the outer surface of the back fat layer. In operation, the knife is rotated or moved through a butt clamped to the support surface. It cuts free a layer of back fat of varying thickness while leaving a layer of back fat of substantially constant thickness adhering to the lean meat.

Broadly stated, an apparatus for severing a layer of back fat from a Boston style pork shoulder butt having lean and fat portions is provided — the apparatus comprises a frame, a saddle element for supporting the butt in position to be severed longitudinally along a path substantially parallel to the fat-lean interface, said saddle element having a support surface contoured to substantially conform with the outer surface of the back fat layer of the butt; an arcuate knife curved to substantially conform to the curved transverse interface line of the lean meat and back fat layer; means pivotally mounting the knife on the frame so that it can be drawn through the butt; means for rotating the knife about an axis generally parallel to the support surface of the saddle along an arc through the butt; and disengageable means associated with the frame for clamping the butt against the support surface during the severing operation; said apparatus being operative to move the knife through the butt to cut a layer of back fat of varying thickness therefrom while leaving a layer of back fat of substantially constant thickness adhering to the lean meat.

DESCRIPTION OF THE DRAWING

In the drawing:

FIG. 3 is a simplified side view showing the pivotable knife assembly, the clamp-down component assembly and the support saddle which carries the cut to be trimmed;

FIGS. 4a and 4b are similar, simplified front views showing left and right shoulder butts being trimmed by the knife — the butts are supported by the saddle and fixed in place by the clamp-down component;

DESCRIPTION OF THE PREFERRED EMBODIMENT

The Frame

Figure 1:
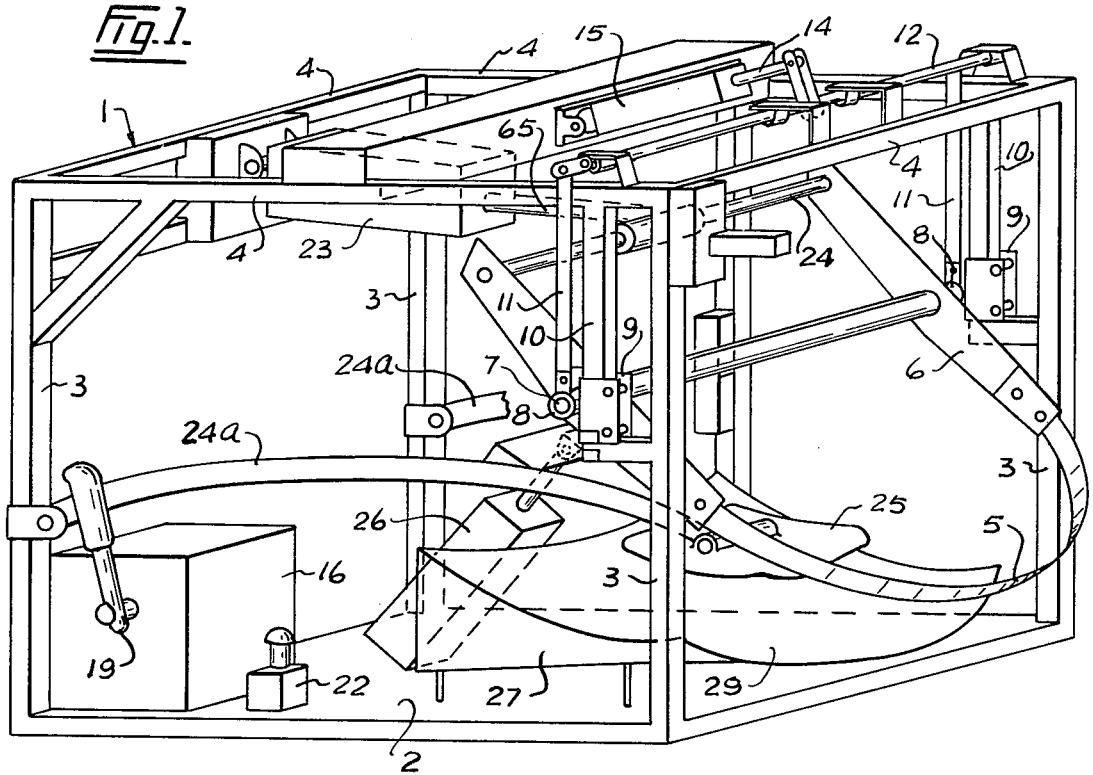
FIG. 1 is a perspective, partly broken away view of the apparatus.
Figure 2:
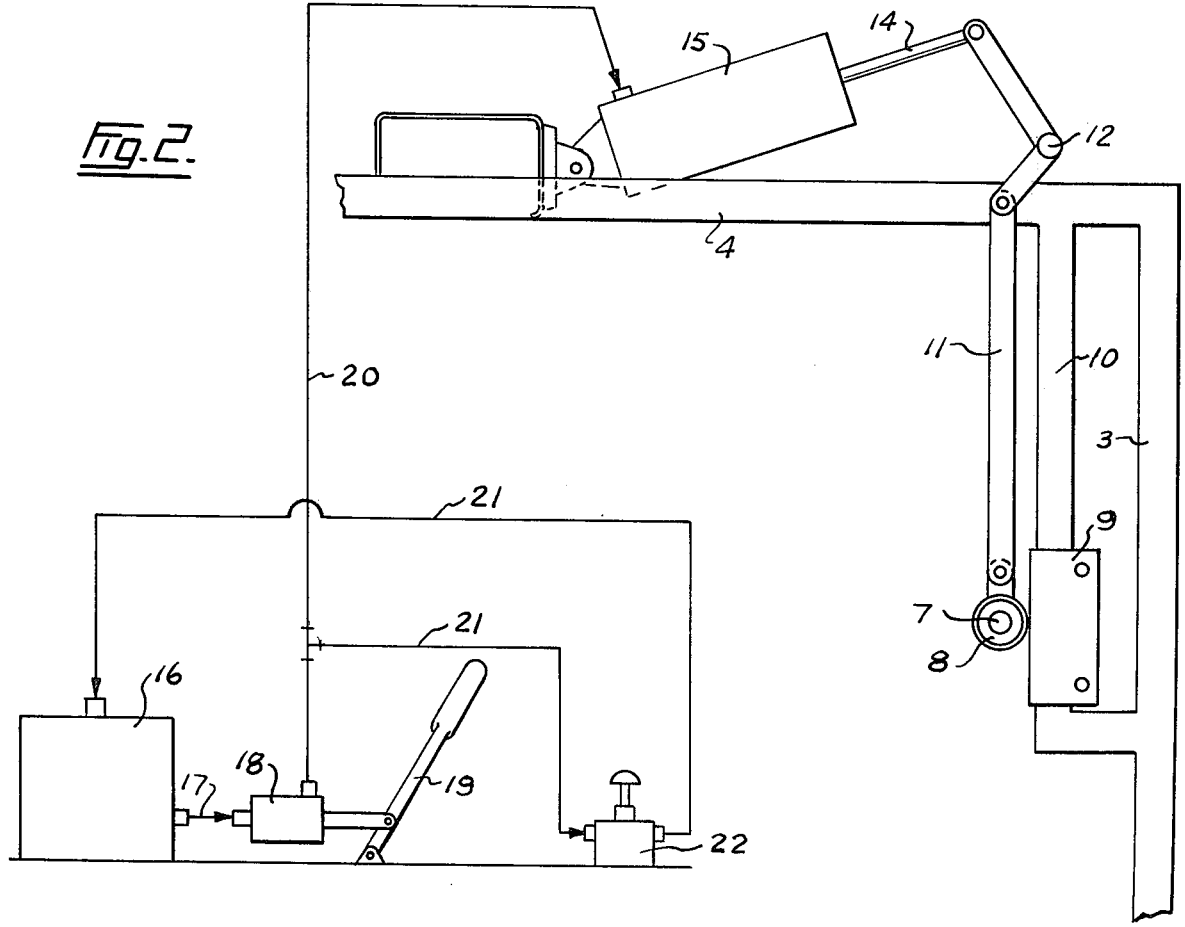
FIG. 2 is a simplified side view showing the assembly for adjusting the vertical position of the knife.
Figure 5A:
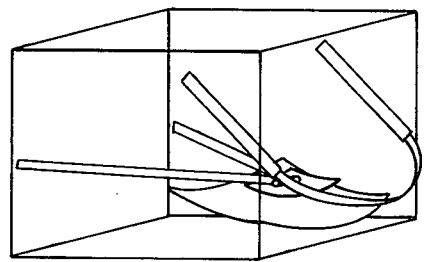
FIGS. 5a – 5e are simplified perspective views showing the interaction between the support saddle, knife and clamp-down component during the sequence of operations involved in trimming a butt.
Figure 5B:
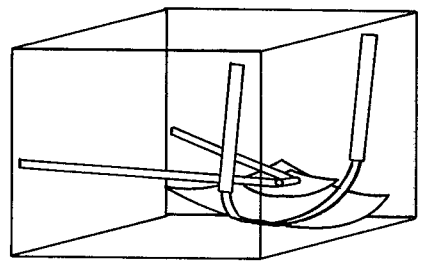
Figure 5C:
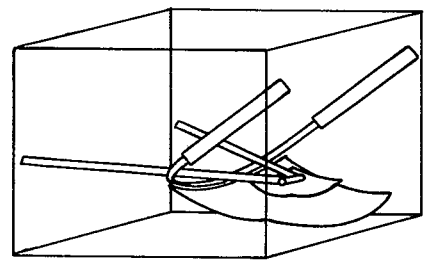
Figure 5D:
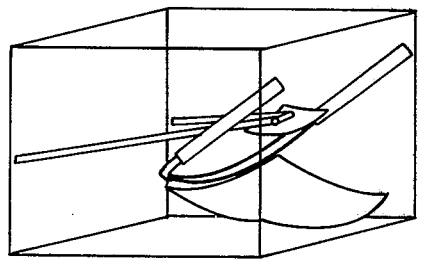
Figure 5E:
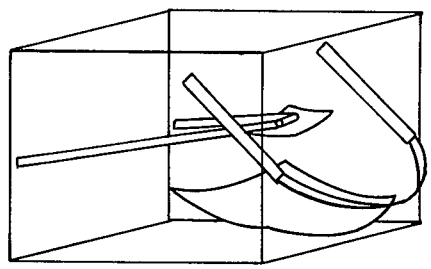
Figure 6:
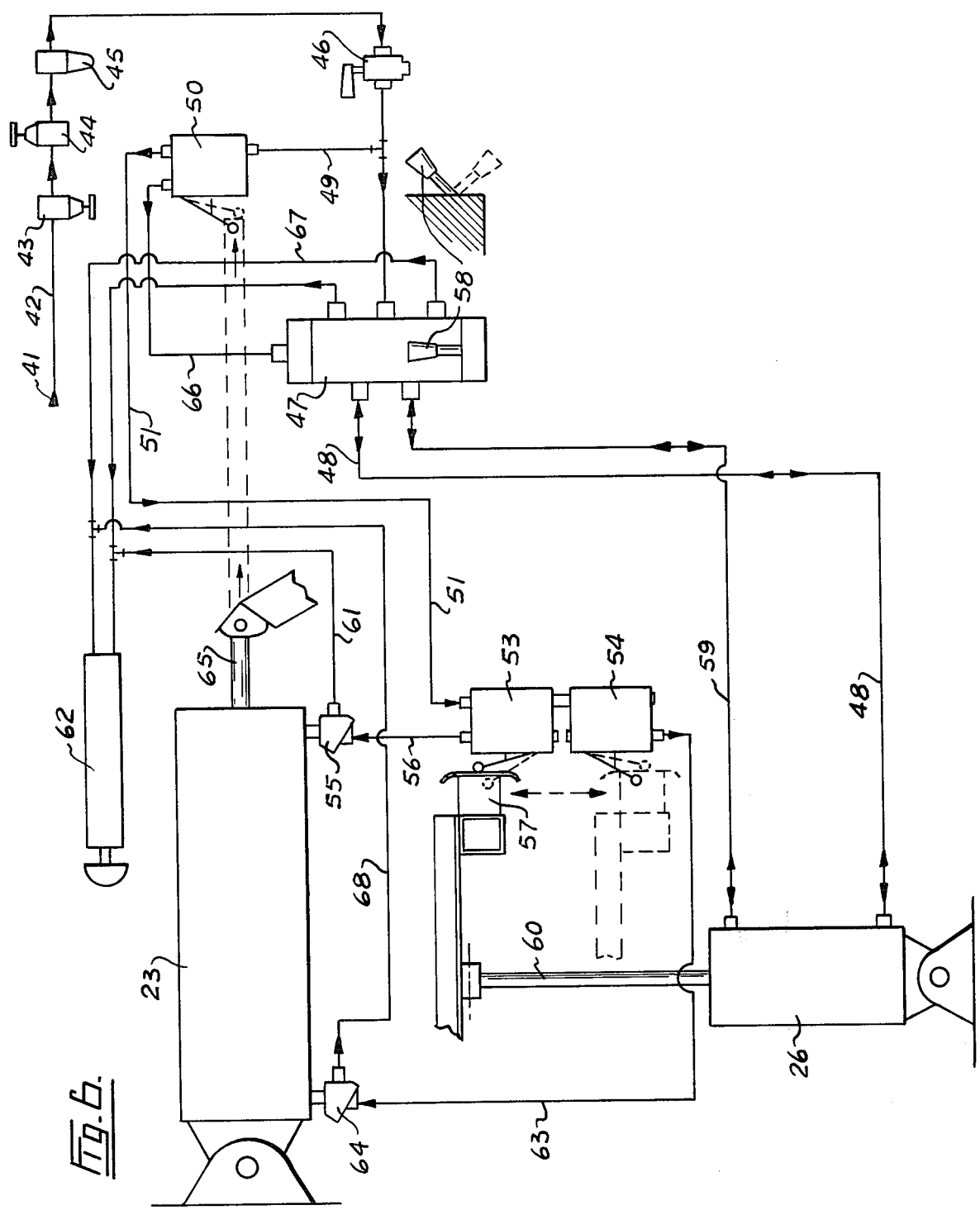
FIG. 6 is a schematic view showing a pneumatic circuit which may be used to sequentially operate the apparatus components.
Figure 7A:
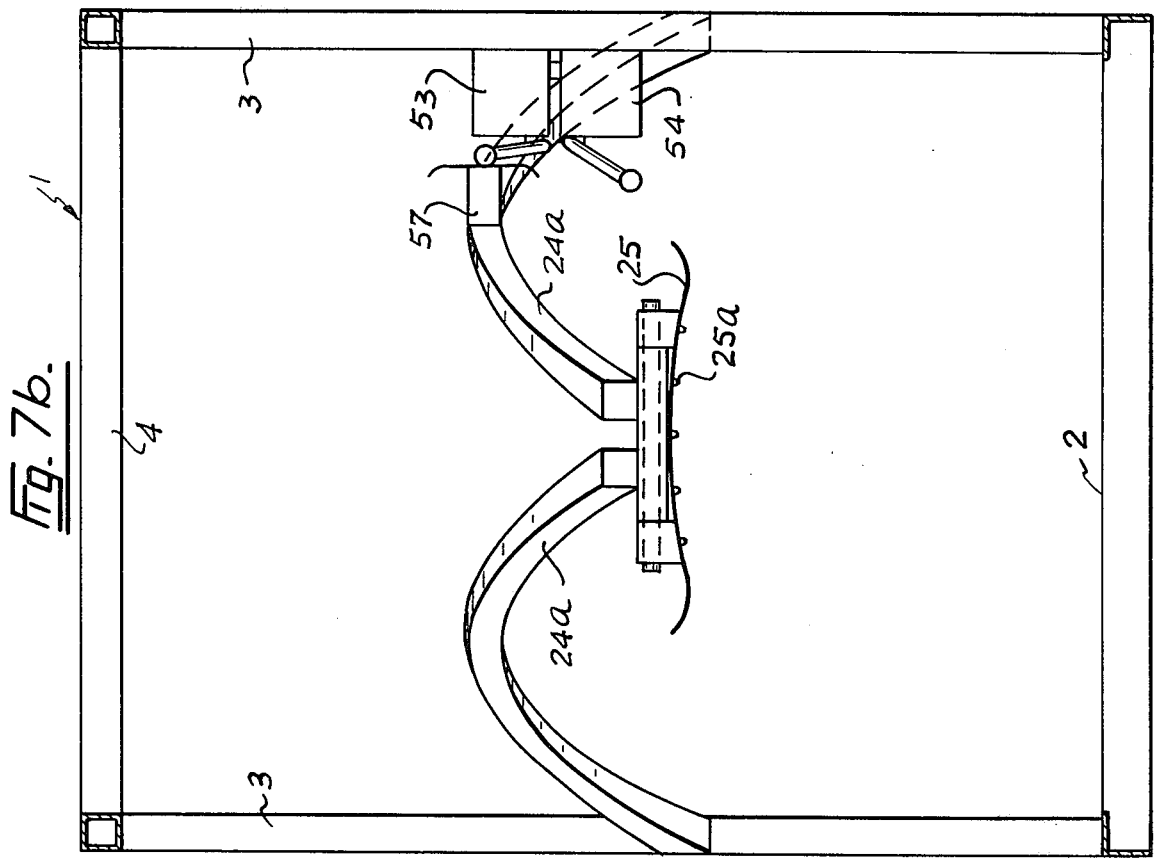
FIGS. 7a and 7b involve a simplified front view, similar to FIG. 4, showing the relationship between the clamp-down arms and pilot valves which form part of the pneumatic circuit.
Figure 7B:
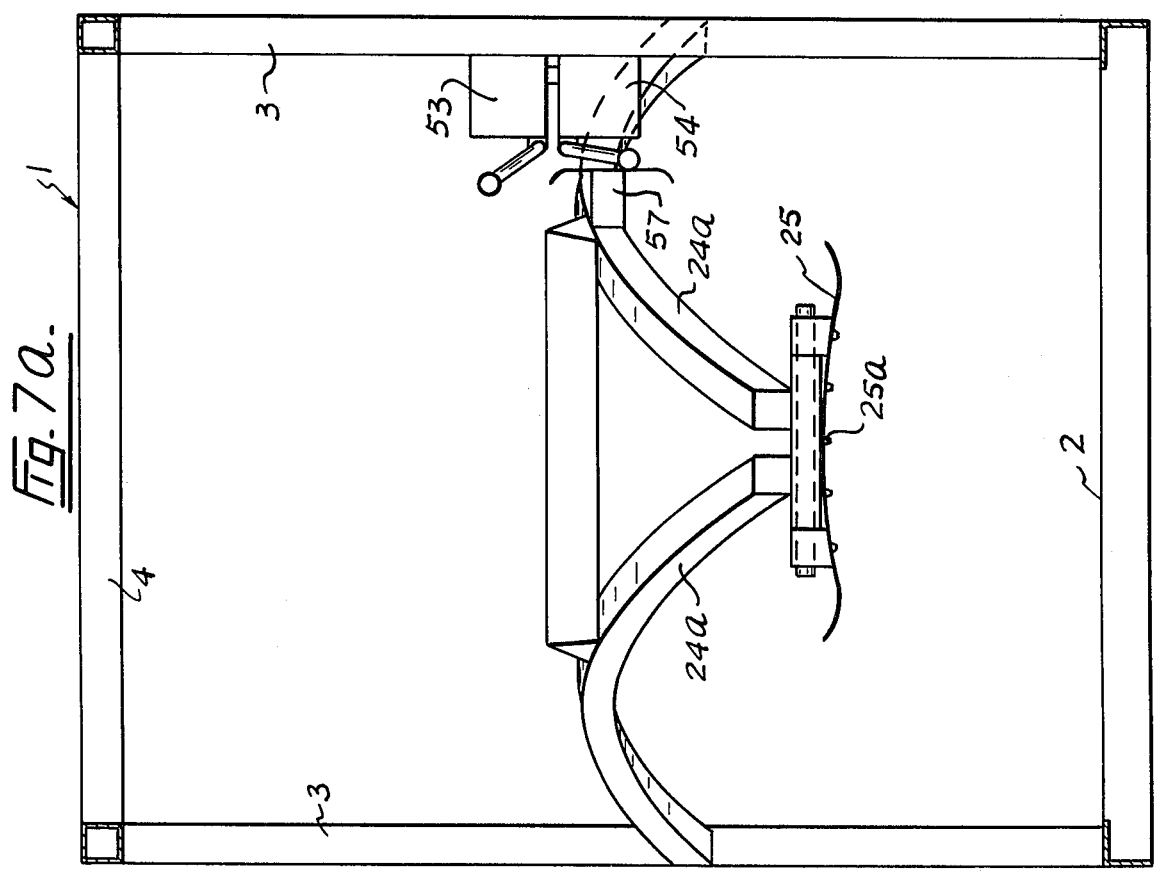

With reference now to the preferred embodiment shown in FIG. 1, the apparatus comprises a box-like frame 1 having a floor member 2, corner posts 3 and connecting struts 4.

The Knife Assembly

An arcuate knife 5 is pivotally mounted on the front corner posts 3 of the frame 1. More particularly, a knife holder 6 is connected to each end of the knife 5. Each holder 6 is rotatably mounted on a stub shaft 7 journalled in a bearing sleeve 8. Each bearing sleeve 8 is attached to a slide member 9 slidably mounted on a guide post 10, which forms part of the front corner post 3.

The bearing sleeve 8 is pivotally attached by a link 11 and cam shaft 12 to the piston rod 14 of a hydraulic cylinder 15. The cylinder 15 is pivotally attached to the frame 1. It will be noted that extension and contraction of the piston 14 will lower and raise the bearing sleeve 8 and the attached knife 5.

A hydraulic circuit is provided to actuate the vertical adjustment cylinder 15. More particularly, a tank 16 supplies fluid through line 17 to a pump 18. The pump 18 is started and stopped by a lever 19. A line 20 connects the pump to the cylinder 15. A bypass line 21 connects the line 20 with the tank 16. This bypass line 21 is controlled by a normally closed valve 22.

In operation, the operator visually gauges the thickness of the fat on the butt 40 to be processed. By manipulating lever 19 or valve 22 he expands or contracts the cylinder 15 to adjust the vertical position of the knife 5 so as to leave a desired thickness of fat back on the cut being processed.

The knife 5 is rotated back and forth through an arc by a pneumatic cylinder 23. This cylinder 23 is pivotally connected to the rear frame strut 4 and to a crossbar 24, attached to the knife holders 6. The system for actuating the cylinder 23 is described below.

The Clamp-Down Assembly

This assembly comprises a pair of curved arms 24a, pivotally attached at their rear ends to the rear corner posts 3 and at their front ends to a plate 25. A pneumatic cylinder 26 is pivotally connected at one end to the arms 24 and at the other end to frame floor member 2. Extension and contraction of the cylinder 26 will therefore raise and lower the plate 25 for purposes of clamping or fixing a butt 40 to the support saddle 27. The system for actuating the cylinder 26 is described below.

It will be noted that the bottom surface of the plate 25 is preferably contoured to conform to the lean surface of the butt 40. Also, the plate 25 is provided with teeth 25a to aid in firmly holding the cut in place.

Configuration of Support Saddle and Knife

The invention utilizes a pivoted or circular arc stroke in combination with peculiarly shaped and positioned knife and saddle components to provide an apparatus capable of trimming a fat layer of varying thickness while leaving a fat layer of substantially constant thickness on the cut. More particularly, the support saddle surface 29 is contoured to conform to the outer surface of the butt back fat layer 30. It has upwardly projecting teeth members 29a for holding the butt 40 in place. The knife 5 is curved to substantially conform to the curved transverse interface line 31 of the lean meat 32 and back fat layer 30 of the butt 40 placed in the apparatus in the position shown in the figures. Finally, the support saddle 27 is associated with the frame 1 in a selected position whereby its support surface 29 holds the butt in a manner such that when the knife 5 is drawn through the butt 40, it will follow a path parallel to the fat-lean interface 31.

As shown, the saddle 27 is preferably formed with left and right duplicate sections 27a and 27b, so that left and right shoulder butts 40a, 40b can be handled in the same machine.

Pneumatic Circuit

The movements of the components of the machine are sequenced to provide the following series of operations: (1) the clamp-down assembly pins a butt to be trimmed to the support saddle; (2) the knife assembly draws the knife through the butt, severing the excess fat; (3) the clamp-down assembly is released; and (4) the knife assembly rotates the knife in the opposite direction to push the trimmed butt and severed fat layer from the support saddle.

More specifically, compressed air is supplied from a source 41 to the line 42 and passes through a bleeder 43 to remove moisture, a pressure reducer 44, and an oil cup 45. It then passes through a main shut-off valve 46 into a combination lever and air pilot valve 47. Air is initially routed through the valve 46 and line 48 to the cap end of the clamp-down assembly cylinder 26 - therefore the cylinder 26 is initially in the extended position and the clamp-down plate 25 is upraised. At the same time, air moves through line 49, a pilot valve 50, and line 51 to pilot valves 53, 54. The shoe 57, carried by upraised clamp-down arm 24a, actuates the pilot valve 53 to allow air to pass through line 56 to quick release valve 55 and into the cap end of knife assembly cylinder 23. Thus the knife 5 is initially held in the position shown in solid lines in FIG. 3.

To initiate the trimming operation of a butt 40 placed on the support saddle 27, the lever 58 of combination level and air pilot valve 47 is actuated. Air is then routed to clamp-down cylinder 26 through line 59 and exhausted through line 48. Thus the piston rod 60 of the clamp-down cylinder 26 is retracted and the clamp-down plate 25 is pressed down onto the butt 40.

With the movement of the clamp-down arm 24a, the shoe 57 moves away from the spring arm of pilot valve 53, thereby closing off the supply of air to line 56. Quick relief valve 55 then opens, permitting air to exhaust from the rod end of knife assembly cylinder 23 into line 61 and through exhaust muffler 62 to the atmosphere.

At the same time, the clamp-down arm 24a brings shoe 57 into contact with the spring arm of the pilot valve 54, thereby opening the valve and allowing air to move through the line 63 and quick release valve 64 to the cap end of the knife assembly cylinder 23. Therefore the piston rod 65 of the cylinder 12 is extended and rotates the blade 5 through the butt 40.

When the piston 65 of the knife assembly cylinder 23 is fully extended, it contacts the spring arm of the pilot valve 50, thereby routing air through line 66 back into the combination lever and air pilot valve 47, where the air retracts the lever 58. Air therefore moves through line 48 to the cap end of the clamp-down cylinder 26 and is exhausted through line 59, pilot valve 47 and line 67 to the muffler 62. The piston rod 60 is therefore extended, raising the clamp-down plate 25.

As the clamp-down arms 24a change position, the shoe 57 leaves the pilot valve 54, thereby closing it, and contacts the spring arm of the pilot valve 53. As a result, the pressure in the line 63 is reduced, the quick release valve 64 opens into line 68 and the cap end of the cutting assembly cylinder 23 exhausts through the muffler 62. Simultaneously, the pilot valve 53 routes the air through line 56 into the rod end of the cylinder 23, thereby retracting it and pushing the trimmed butt and severed fat layer from the support saddle 27. The sequence is then complete and the machine is ready to process another cut.

Obvious variations in the specific constructional details described hereinabove may be made without departing from the spirit of the invention, and such embodiments of the invention as come within the scope and purview of the appended claims are to be considered as part of this invention.

What is claimed is:

1. Apparatus for severing a layer of back fat from a Boston style pork shoulder butt having lean and fat portions, comprising:
    a frame;
    a saddle element associated with the frame for supporting the butt in position to be severed longitudinally along a path substantially parallel to the fat – lean interface, said saddle element having a curved support surface contoured to substantially conform with the outer surface of the back fat layer of the butt;
    an arcuate knife curved to substantially conform to the curved transverse interface line of the lean meat and back fat layer;
    means pivotally mounting the knife on the frame so that it can be drawn through the butt;
    means for rotating the knife about an axis fixed during pivoting movement of the knife and generally parallel to the support surface of the saddle along an arc through the butt; and disengageable means associated with the frame for clamping the butt against the support surface during the severing operation;

said apparatus being operative to move the knife through the butt to cut a layer of back fat of varying thickness therefrom while leaving a layer of back fat of substantially constant thickness adhering to the lean meat.

Also enclosed, for purposes of the record, are photostatic copies of two letters which were shown to the Examiner during the interview.

2. The apparatus as set forth in claim 1 comprising:

means associated with the frame for vertically moving the knife to adjust its position before making a cut through a butt.

3. The apparatus as set forth in claim 2 wherein:

the means for rotating the knife is operative to move it back and forth along an arc on cutting and discharging strokes.

4. The apparatus as set forth in claim 2 comprising:

means for actuating the clamping and knife rotating means in sequence whereby the clamping means may be actuated to fix a butt on the support surface, the rotating means is then actuated to move the knife through the butt, the clamping means is then disengaged to release the butt, and the rotating means is then actuated to return the knife to its original position, thereby propelling the butt and severed fat from the support surface.

* * * * *